(12) United States Patent
Joly et al.

(10) Patent No.: US 11,409,822 B2
(45) Date of Patent: Aug. 9, 2022

(54) ALIGNMENT OF VALUES AND OPINIONS BETWEEN TWO DISTINCT ENTITIES

(71) Applicants: Christophe Joly, Redwood City, CA (US); Kimberly Emilie Joly, Paris (FR)

(72) Inventors: Christophe Joly, Redwood City, CA (US); Kimberly Emilie Joly, Paris (FR)

(73) Assignee: Alygne, Redwood City, CA (US)

( * ) Notice: Subject to any disclaimer, the term of this patent is extended or adjusted under 35 U.S.C. 154(b) by 0 days.

(21) Appl. No.: 17/021,913

(22) Filed: Sep. 15, 2020

(65) Prior Publication Data

US 2022/0083612 A1    Mar. 17, 2022

(51) Int. Cl.
    *G06F 16/9535* (2019.01)
    *G06F 16/951* (2019.01)
(52) U.S. Cl.
    CPC ........ *G06F 16/9535* (2019.01); *G06F 16/951* (2019.01)

(58) Field of Classification Search
    CPC .................... G06F 16/9535; G06F 16/951
    See application file for complete search history.

(56) References Cited

U.S. PATENT DOCUMENTS

| | | | |
|---|---|---|---|
| 2007/0041618 A1* | 2/2007 | Harrington | G06F 40/226 382/112 |
| 2015/0120620 A1* | 4/2015 | Rutledge | G06Q 10/0637 706/46 |
| 2018/0189691 A1* | 7/2018 | Oehrle | G06N 7/005 |
| 2019/0259002 A1* | 8/2019 | Balasia | G06Q 10/1053 |
| 2021/0019339 A1* | 1/2021 | Ghulati | G06Q 50/00 |
| 2021/0256367 A1* | 8/2021 | Mor | G06N 3/08 |
| 2021/0279297 A1* | 9/2021 | Mallin | G06F 21/10 |

* cited by examiner

*Primary Examiner* — Apu M Mofiz
*Assistant Examiner* — Oscar Wehovz
(74) *Attorney, Agent, or Firm* — Patent PC; Bao Tran

(57) ABSTRACT

Systems and methods are disclosed for determining compatibility based on one or more social values by receiving a request for the alignment of values between a user and an entity; determining values associated with the user and the entity; for each value, determining the alignment between the user value and the entity value; and generating a composite compatibility rank, the alignment score, between the user and the entity.

19 Claims, 12 Drawing Sheets

ALIGNMENT OF VALUES AND OPINIONS BETWEEN TWO DISTINCT ENTITIES

The present invention relates to systems and methods for determining and aligning values and opinions.

Purpose, mission and values between an organization and its stakeholders are elements that help organizations and people stay on track and work toward achieving their ultimate goals. For people, a person's core values highlight what he/she stands for. Core values guide the person's behaviors, decisions, and action. Living in accordance with one's core values can lead to greater fulfillment. When the core values are not known, they can be violated and can create internal tension that triggers destructive habits and regressive behavior.

For companies, values define what an organization believes and the behaviors it agrees to live by every day. Values set expectations for how employees behave when interacting with customers, colleagues and partners. Values communicate what is important to the organization and provide clarity and direction for decision-making. Some organizations use the terms guiding principles, company principles and company beliefs interchangeably for values. When thoughtfully developed and effectively implemented, values act as a roadmap to guide business decisions, inspire employees and establish customer loyalty. Stakeholders have values that can be reflected in blogs, opinions, or beliefs formed by people about a topic or issue. Opinions are often expressed in publications or social media comments. However, there is no systematic method for companies to quantify and compare their values with their user's values.

SUMMARY

Systems and methods are disclosed for determining compatibility based on one or more social values by receiving a request from a processor for the value alignment between a user and an entity; determining user values associated with the user; for each user value, determining a value alignment score between the entity value and the user value; and generating a composite compatibility rank between the user and the entity.

Advantages of the systems and methods may include one or more of the following. The system supports value alignment as an emergent property in organizations that have a critical mass of people with a common language of values and clarity about how their personal values, personal vision/mission and goals align with the desired values, mission/vision and goals of the organization.

The system provides a navigational aid that helps companies/entities engage in a consultative conversation focused on value and differentiation in a way that has meaning to the end-user or buyer. Individual reps can tailor it to their own selling style and other departments can use it as a way to stay user-focused. Marketing can use the system to position its content and align its campaigns in alignment with user values. And, services better understand the promises made to the customer in the sales process. The tool thus enables the entity/company to have a marketing or messaging consistency needed to better align the company/entity with users/buyers.

From the users' perspective, the system aids in decision making, making sure they align with their values. Examples include buying a product, supporting an organization, watching a movie, to name a few. As a result, users have a greater impact on companies, to influence their positions on a variety of issues like global warming, the use of GMO, gun control, abortion, and more.

DETAILED DESCRIPTION

Figure 1:
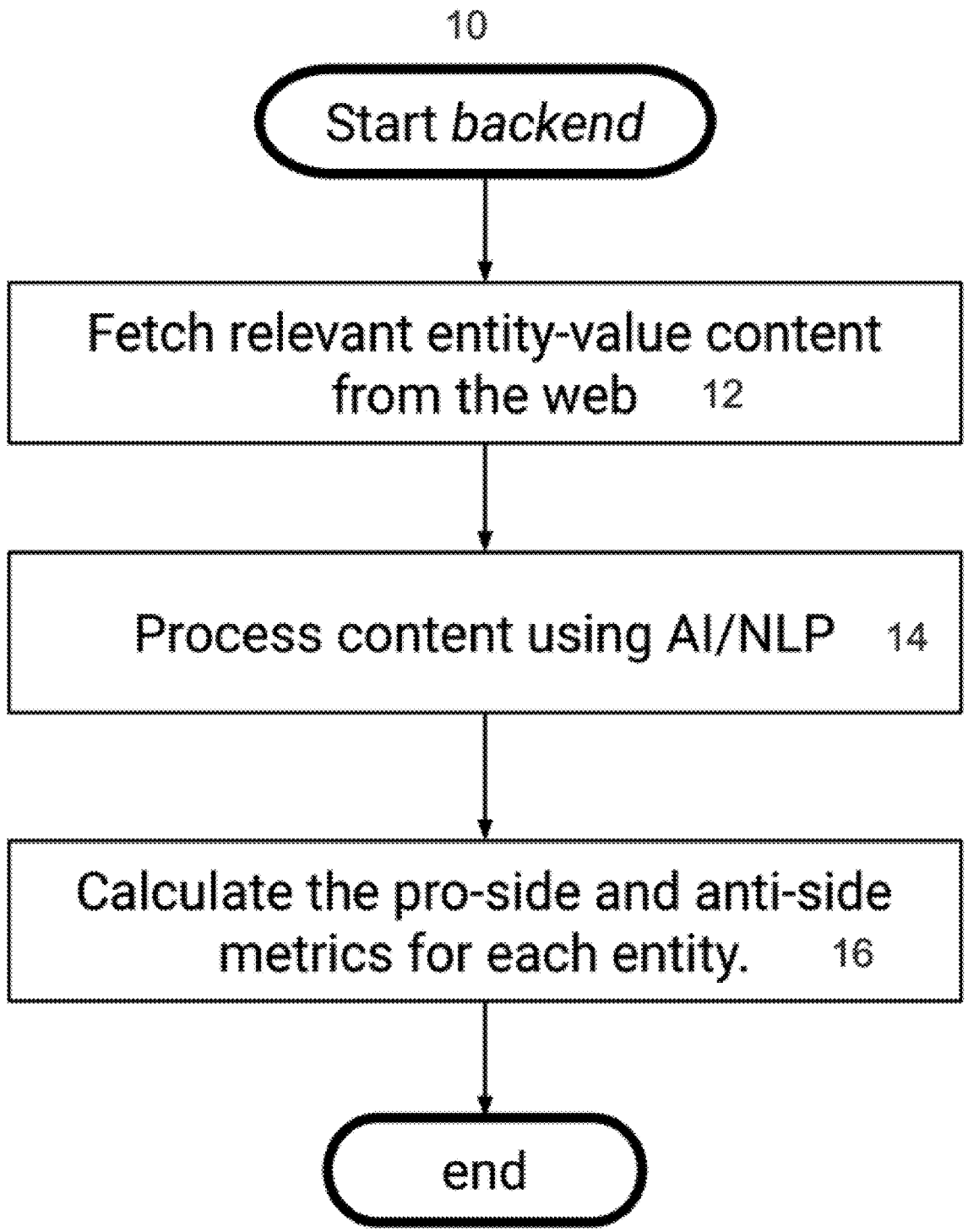
FIG. 1 shows an exemplary process for determining entity-value content metrics.

FIG. 1 shows an exemplary method 10 for determining entity-value content metrics. The method starts by fetching relevant entity-value content from the web (12). This can be done using web crawlers. A web crawler copies webpages so that they can be processed later by the search engine, which indexes the downloaded pages. The web crawler also validates links and HTML code, and sometimes it extracts other information from the website. Web crawlers are known by a variety of different names including spiders, ants, bots, automatic indexers, web cutters, and (in the case of Google's web crawler) Googlebot.

One web crawler embodiment captures "value" data on users and companies/entities. The term value can include opinions, causes, and practices. Examples include Guns, Abortion, Climate Change, LGBT, Palm Oil, . . . Basically, any topic a person may have an opinion about. Opinions are easier to measure, more dynamic, and evoke more discussions or comments that can be crawled. The data can be from blog postings, articles, social media postings, among others.

Next, the method processes content using artificial intelligence techniques with natural language processing (NLP) (14). In one embodiment, the NLP runs a Sentence Segmentation model by splitting apart sentences with a punctuation mark, for example. Next, the system performs Word Tokenization and part of speech detection—whether it is a noun, a verb, an adjective and so on. Text Lemmatization can be done to determine the most basic form or lemma of each word in the sentence. The system then removes Stop Words and then performs Dependency Parsing. The system can perform Named Entity Recognition (NER) in extracting ideas. NER is used to detect and label nouns with the real-world concepts that they represent by using the context of how a word appears in the sentence and a statistical model to guess which type of noun a word represents. The NER system can tag: People's names, Company names, Geographic locations (Both physical and political), Product names, Dates and times, Amounts of money, Names of events. NER can be used to extract structured data out of text from the NLP pipeline. Coreference Resolution may be done.

The process calculates the pro-side and the anti-side metrics for each entity (16). This can be done using sentiment analysis.

Figure 2:
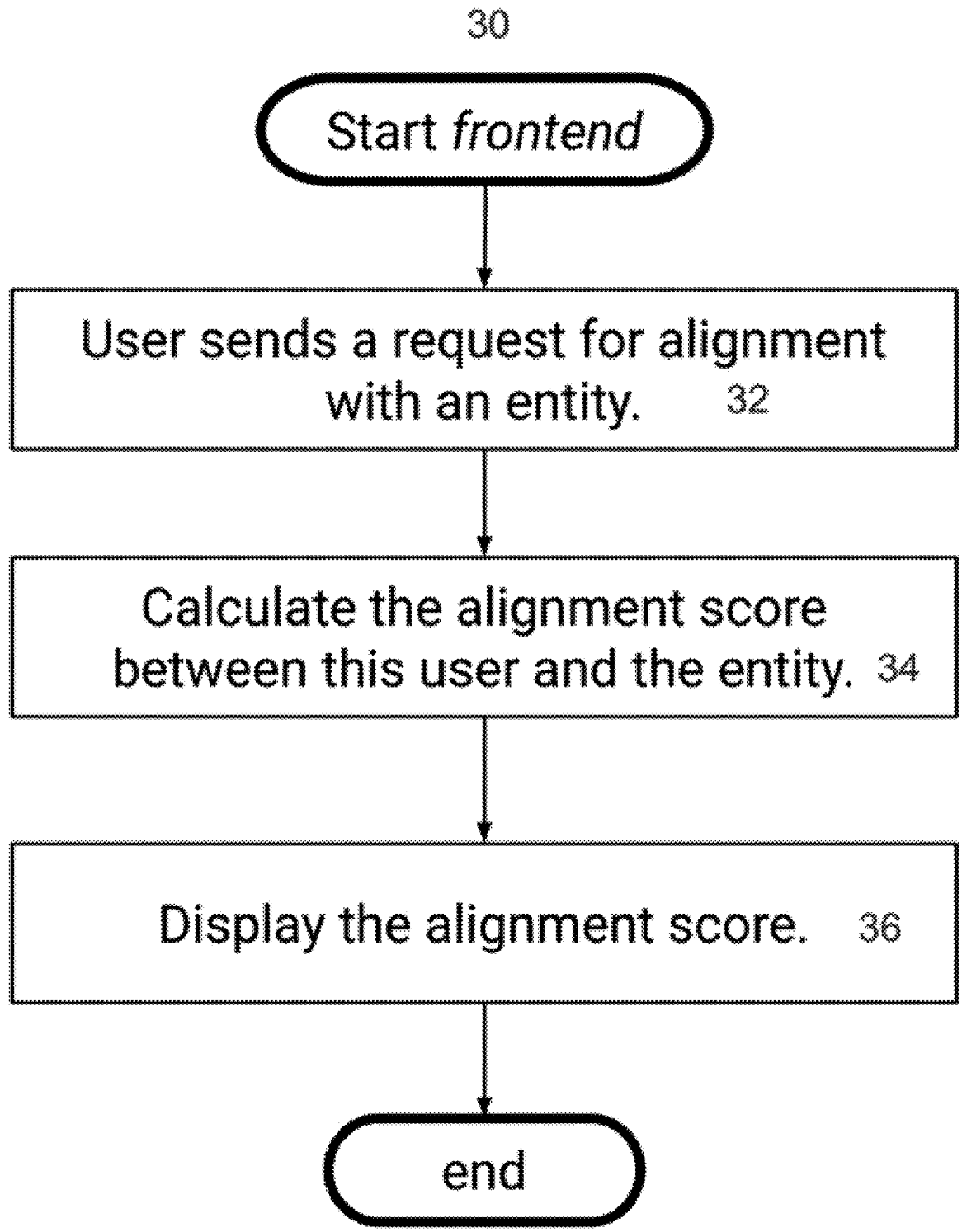
FIG. 2 shows an exemplary process for responding to a request to determine the alignment between two entities using the metrics of FIG. 1.

FIG. 2 shows an exemplary method for responding to a request to determine alignment between two entities using the metrics of FIG. 2. In method 30, the user sends a request for alignment with an entity (32). The method calculates the alignment score between the user and the entity (34) such as those in FIG. 3, and displays the alignment score (36). Exemplary user interface screenshots for FIG. 2 are shown in FIGS. 9-12 as detailed below.

Figure 3:
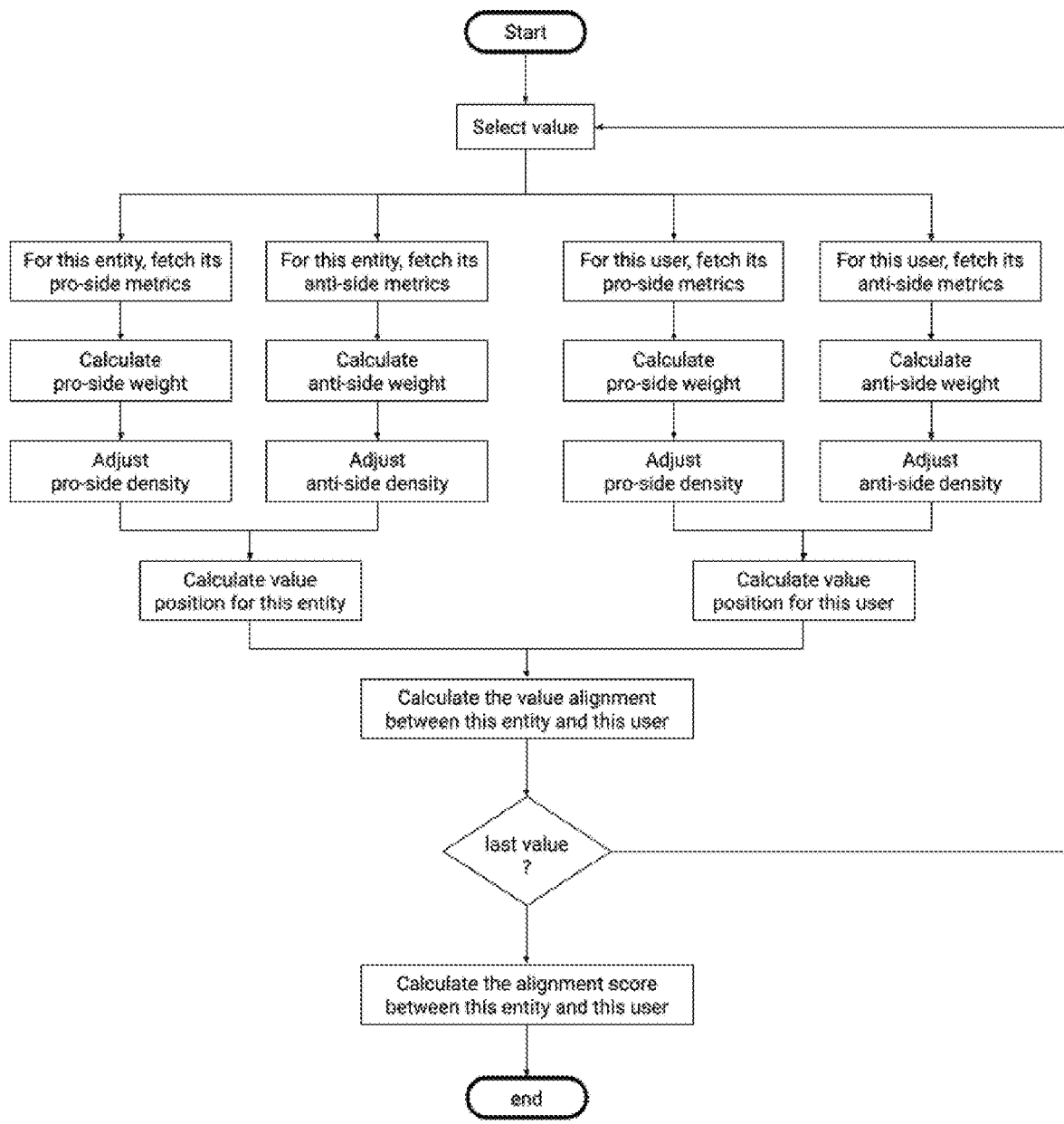
FIG. 3 shows an exemplary process for determining alignment between an entity and a user.

FIG. 3 shows an exemplary method 100 for determining an alignment score between an entity and a user. Initially, a value is selected (102). For a particular entity, pro-side metrics and anti-side metrics are determined for the value, and the same is done for the user and the value. To illustrate, the method 100 using values selected in 102 fetches the pro-side metrics (104), determines the entity's pro-side weight (106), and adjusts the pro-side density (108). Correspondingly, method 100 using values selected in 102 fetches the anti-side metrics (114), determines the entity's anti-side weight (116), and adjusts the anti-side density (118). The method then determines the value position for the entity (120).

Correspondingly, for a particular user, using value selected in 102 the method fetches the pro-side metrics (134), determines the user pro-side weight (136), and adjusts the pro-side density (138). The method 100 also fetches the anti-side metrics (144), determines the user anti-side weight (146), and adjusts the anti-side density (148). The method then determines the value position for the user (150).

From 120 and 150, the method determines a value alignment between the entity and the user (160). Next, the method checks if all values have been processed (162) and if not, loops back to 102 and otherwise determines an alignment score between the entity and the user (170) and exits.

In one embodiment, one list of values exists, curated manually to ensure quality and certain properties like positive endorsement, connection, . . . Changes to the list can be assisted by automatic tools. For example, the opinion "Trump Impeachment" is highlighted as a new important opinion because the "automatic tools" determine from web chatters and understand its relevance for the time being, per geographical region.

A value may lose its interest over time, but it is not deleted from the list for historical reasons. For example, if the CEO of Acme is vocally opposed to the value such as "Trump Impeachment" for example, and the user is strongly in favor of Impeachment, the opinion misalignment is stored, long after the impeachment is over.

Next is a discussion for two value sides: _anti and _pro. Each value has two opposite sides, called a value side (vs), forming a value pair (vp):

|  | value sides |  |  |  |  |  |  |
|---|---|---|---|---|---|---|---|
| value pair | _pro | yes | agree | for | ensorse | advocate | . . . |
|  | _anti | no | disagree | against | disavow | criticize | . . . |
| Examples: |  |  |  |  |  |  |  |
| value: | gun | gmo | trump |  |  |  |  |
| value pair | gun_pro | gmo_pro | trump_pro |  |  |  |  |
|  | gun_anti | gmo_anti | trump_anti |  |  |  |  |

For a value, the term _anti and _pro may not always be the most appropriate. Consider for example the value gun in the USA: gun_anti is called Gun Control, whereas gun_pro is called Gun Rights. Similarly for abortion, the two opposite sides are Pro Life (abortion anti) and Pro Choice (abortion_pro). However, in another geographical region of the world, gun_anti may be called Ban All Guns and gun_pro called We Love Our Guns.

The system can distinguish the value terms used to discuss user position (_anti and _pro) versus the terms exposed to the users based on their location (Gun Control and Gun Rights).

The relevance indicates how relevant the value is in a geographical location. For example, the value gun in France may be at 0.2 versus gun in the USA at 0.9.

(least relevant) $0.0 \leq relevance \leq 1.0$ (most relevant)

The relevance number serves to present the most relevant values to users based on the geographical location, instead of just randomly or alphabetically.

The raw density number indicates the correlation between an entity (or user) and the side of a value, say gun_pro. Finding a lot of positive articles about Hooli and Gun Rights results in a high density number for gun_pro, but it does not necessarily characterize the entity-value completely (see other factors later in this document).

(least correlation) $0.0 \leq density \leq 1.0$ (most correlation)

Example

If Hooli has gun_pro at 0.9 and Acme has gun_pro at 0.1, it means gun_pro correlates well with Hooli, but not so much with Acme.

The density number correlates one side of the value, not its opposite. Each side's density is calculated independently. Logically, a high density for one side should result in a low density for the opposite side, but it's not guaranteed since each density is again determined independently from each other.

Set by user: When a user indicates directly his opinion on a value, the densities are set as:

| For: | _pro = 1.0 | Against: | _pro = 0.0 |
|---|---|---|---|
|  | _anti = 0.0 |  | _anti = 1.0 |

The credibility factor indicates how credible the density number is, adjusting the density down. Thousands of random tweets may result in a high density number, indicating a very strong correlation. But the authors of those tweets may not be very credible, thus lowering the density number. Conversely, a handful of articles from trustworthy sources like the New York Times result in a high credibility number.

(least credible) $0.0 \leq credibility \leq 1.0$ (most credible)

Example

Hooli has a density of 0.9 on gun_pro but the sources have a credibility of 0.2, thus not as trustworthy as Acme with a density of 0.7 and a credibility of 0.9.

The importance factor indicates how important the side of a value side is in relation to the entity. A strongly-correlated article may result in a high density number, but if it's only one article, it reduces the importance of the value.

(least important) $0.0 \leq importance \leq 1.0$ (most important)

Example

Hooli has a density of 0.9 on gun_pro and a density of 0.7 of gun_anti. However, the importance factor on Hooli and gun_pro is only 0.1 because the source is just one article from five years ago. On gun_anti however, a handful of articles were recently published, resulting in an importance of 0.8. Thus, Hooli is more gun_anti after taking into account the important factors.

The credibility and importance factors determine the adjusted density:

$$density\_adjusted = density * FW$$

where $$FW = \sqrt{importance * credibility}$$

$$0.0 \leq density\_adjusted \leq 1.0$$

Example

| Entity | value side | density | credibility | importance | density_adjusted | comment |
|---|---|---|---|---|---|---|
| Hook | gun_pro | 1.0 | 1.0 | 1.0 | 1.00 | Hooli is 100% gun_pro. |
| Acme | gun_pro | 1.0 | 0.5 | 1.0 | 0.71 | Acme is also strongly correlated to gun_pro, but the sources' poor credibility reduces its density. |
| Hooli | lgbt_anti | 1.0 | 1.0 | 0.2 | 0.45 | Gavin Belson may be credible . . .sigh. . . when he supported the LGBT community, but that was ten years ago. |
| Hooli | gmo_anti | 1.0 | 0.1 | 0.1 | 0.10 | Strong correlation between Hooli and gmo_anti, but a poor credibility and a weak importance lower drastically the density. |

When a user indicates directly his opinion on a value, the densities are set as follow:

|  | For | Against |
|---|---|---|
| density_pro = | 1.0 | 0.0 |
| density_anti = | 0.0 | 1.0 |
| credibility = | 1.0 | 1.0 |
| importance = | (*) | (*) |

Set to 1.0 when this value is a favorite. Otherwise, set to default (to be determined).

Example

A user indicates being Pro Choice (and a favorite value), for Gun Control, but neutral on Climate Change.

| value (geo value usa) | value | density just | importance | credibility | density_adjusted | position |
|---|---|---|---|---|---|---|
| Pro Choice | abortion_pro | 1.0 | 1.0 | 1.0 | 1.00 | +1.0 |
| (for abortion_pro) | abortion_anti | 0.0 |  |  | 0.00 |  |
| Gun Control | gun_pro | 0.0 | 0.5* | 1.0 | 0.00 | −0.7 |
| (for gun_anti) | gun_anti | 1.0 |  |  | 0.71 |  |
| Believe in Climate Change | climatechange_pro | 0.0 | 0.5* | 1.0 | 0.00 | 0.0 |
| (neither pro/anti) | climatechange_anti | 0.0 |  |  | 0.00 |  |

*Default set to 0.5.

The two-side adjusted densities of a value determine position of this entity in regard to this value:

position=*FP*=density_adjusted_pro−density_adjusted_anti (_anti)−1.0≤position≤+1.0 (_pro)

Example

| value | value side | density_adjusted | position | translated in region value (usa) |
|---|---|---|---|---|
| gun | _pro | 0.60 | +0.52↗ | Gun Rights |
|  | _anti | 0.08 |  | Gun Control |
| climatechange | _pro | 0.06 | −0.84↘ | Believe in Climate Change |
|  | _anti | 0.9 |  | Do not believe in Climate Change |
| abortion | _pro | 0.45 | +0.07⇒ | Pro Choice |
|  | _anti | 0.38 |  | Pro Life |
| childlabor | _pro | 0.25 | −0.43↘ | Use Child Labor |
|  | _anti | 0.68 |  | No Child Labor |

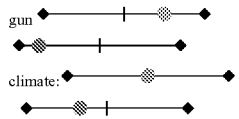

Figure 4:
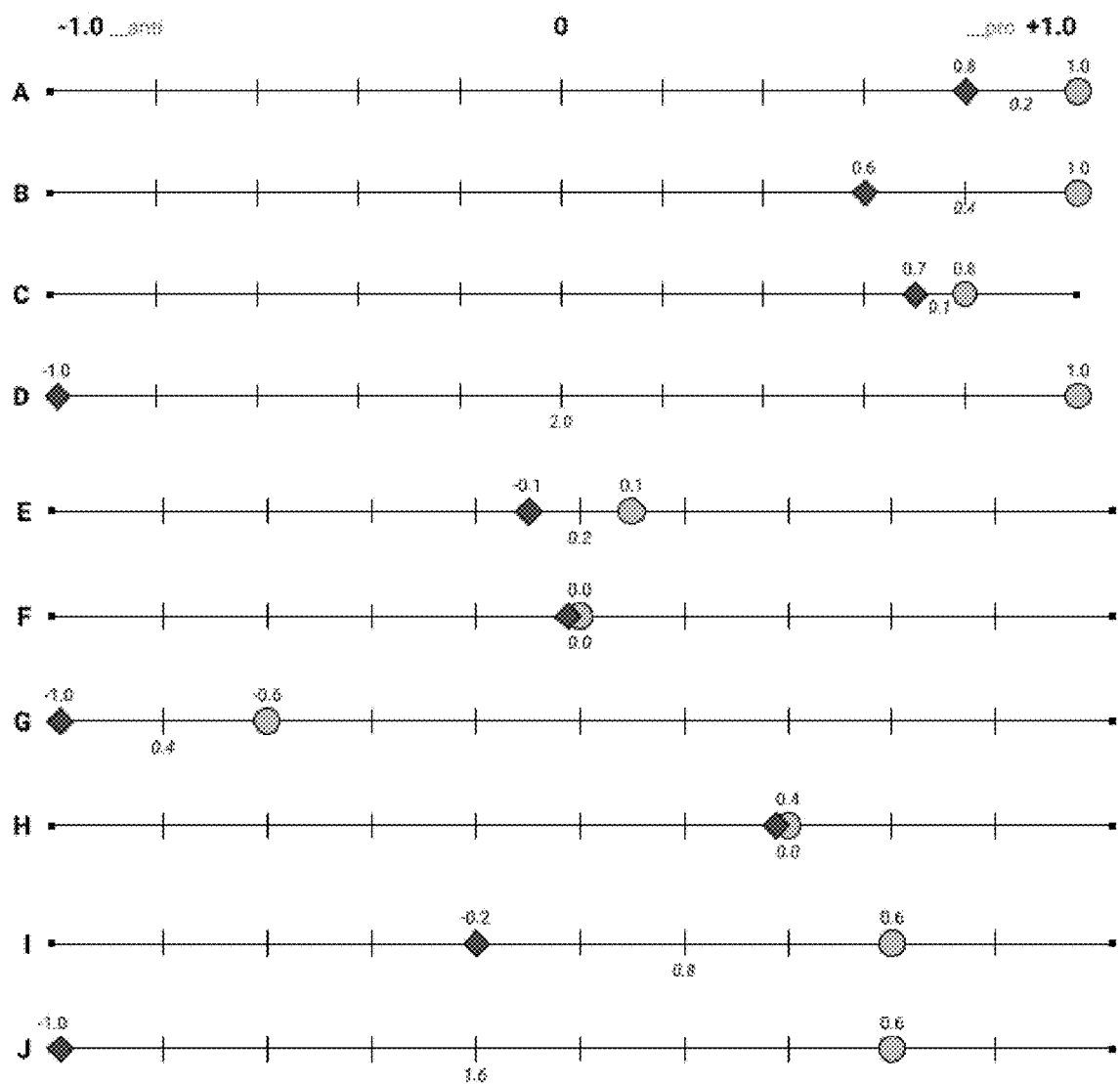
FIG. 4-8 show exemplary details of one implementation of the alignment determination process.

Alignment is detailed next. FIG. 4 shows a variety of situations between the position of an entity and the position of a user but this also applies between two entities, or two users.

One unused embodiment applies the distance between the two positions to determine the alignment. After all, the lower the distance |u.P−e.P| (where u.P is the user's position and e.P is the entity's position) the closer their opinions are on a particular value. However, the preferred embodiment applies the following: Case A is more aligned than case C, even though case C has a shorter distance. Case F illustrates this point more clearly. Its distance is zero but a lot less aligned than case A because the positions are calculated based on densities, which are correlations, not statements.

Instead, the alignment per value is a function of (i) the average and (ii) the distance, weighted by the distance adjustment factor K. Notice that the distance is divided by 2 to keep the lower limit of the alignment to −1.0 instead −2.0.

alignment=*FA*=*f*(distance, average)=|average|−(distance/2)**K*

−1.0≤alignment≤+1.0

Figure 5:
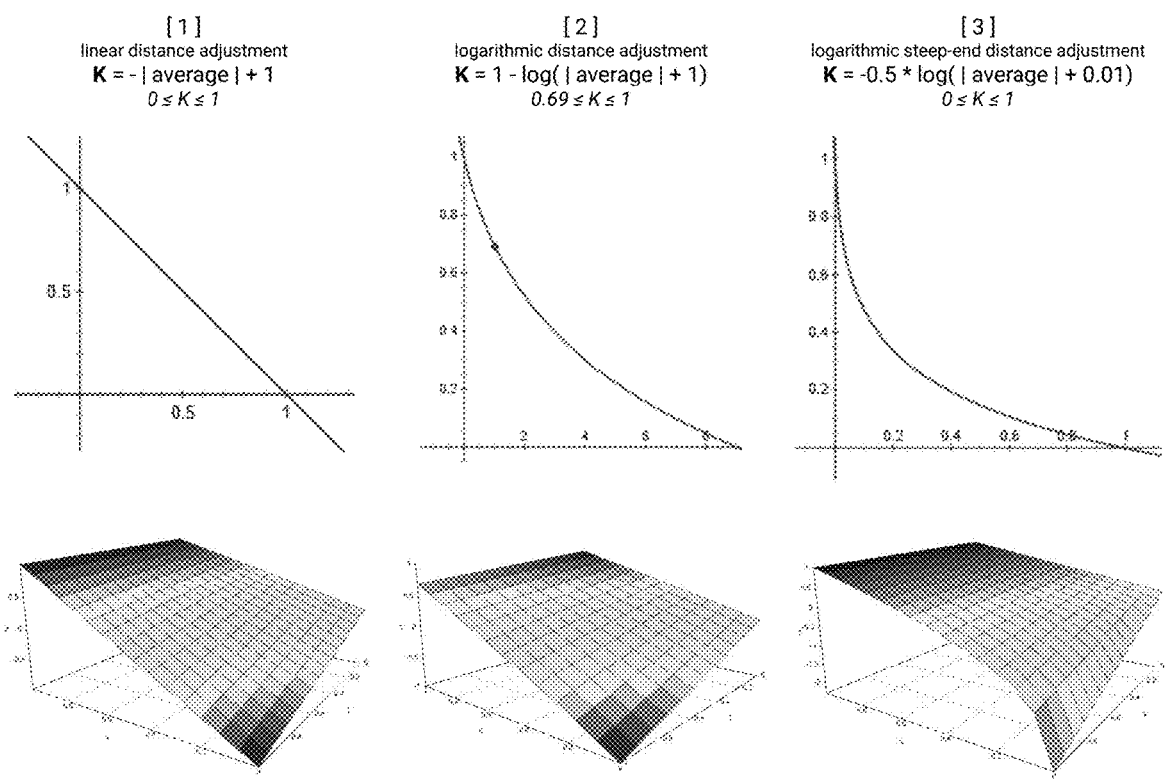

FIG. 5 illustrates various K options used in determining alignment.

| [1] | [2] | [3] |
|---|---|---|
| linear distance adjustment | logarithmic distance adjustment | logarithmic steep-end distance adjustment |
| K = −\| average \| + 1 | K = 1 − log (\| average \| + 1) | K = −0.5 * log (\| average \| + 0.01) |
| 0 ≤ K ≤ 1 | 0.69 ≤ K ≤ 1 | 0 ≤ K ≤ 1 |

The scoring is detailed next. So far the alignment is for just one value, between an entity and a user. All values between an entity and a user are sorted based on the alignment number, from the least aligned value (alignment=−1.0) to the most aligned value (alignment=+1.0). To calculate the final alignment, called the score, a simple average calculation does not work because it gives equal weight to every value alignment, whether it is 1.0 or 0.1. The problem is similar to the per-value alignment calculation, i.e. a low alignment number means the entity and the user are poorly aligned but based on poor correlation, not based on poor actual statement.

Figure 6:
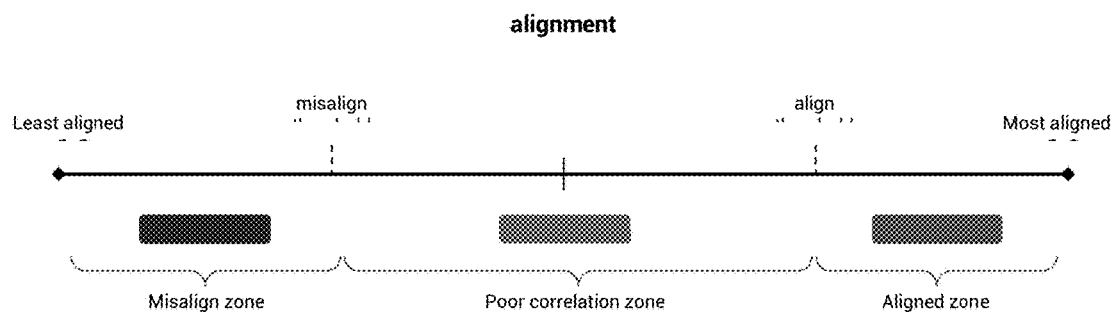

As shown in FIG. 6, two programmable thresholds ("misalign threshold" and "align threshold") determine three zones: misaligned zone, poor alignment, and aligned zone. The score is calculated as follow, with M as the alignment score multiplier:

$$\text{score} = \sum_{v=1}^{v=n} A*M \Big/ \sum_{v=1}^{v=n} M$$

where
M=1.0 in zones "misalign" and "align".
M=|A| in zone "poor correlation".

−1.0≤score≤+1.0

Figure 7:
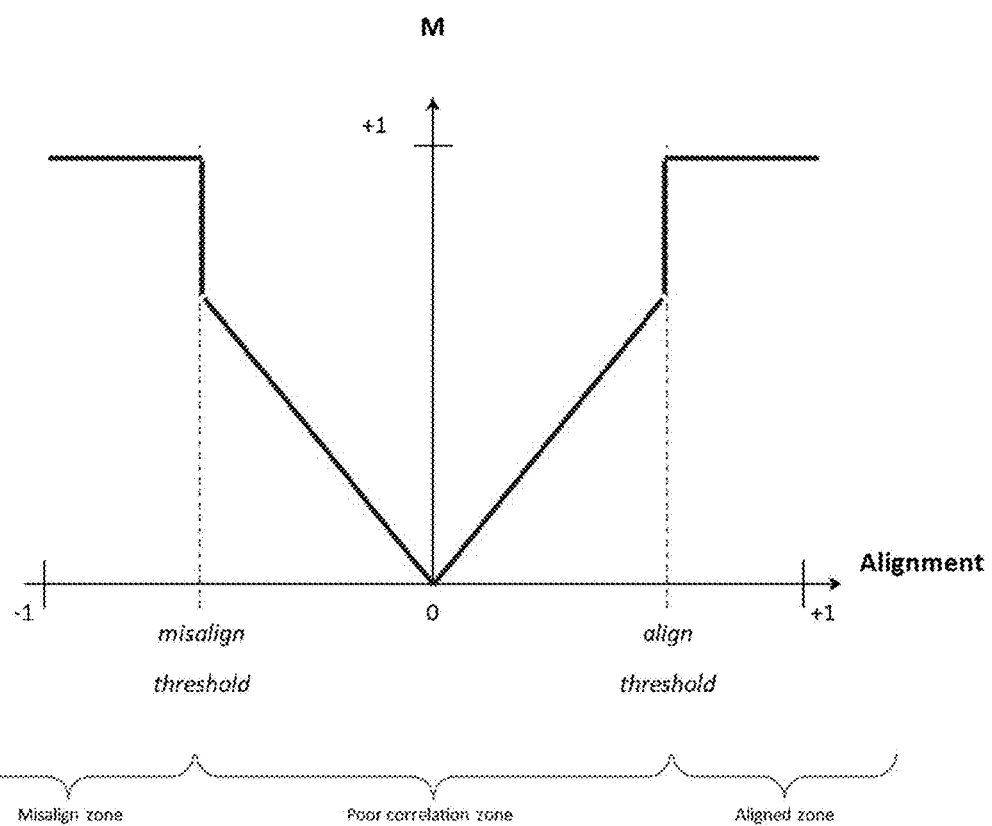

As shown in FIG. 7, the score represents the final alignment between an entity and a user taking into account the alignment of every value but applying a different multiplier when the alignment is less meaningful, i.e. closer to zero.

Figure 8:
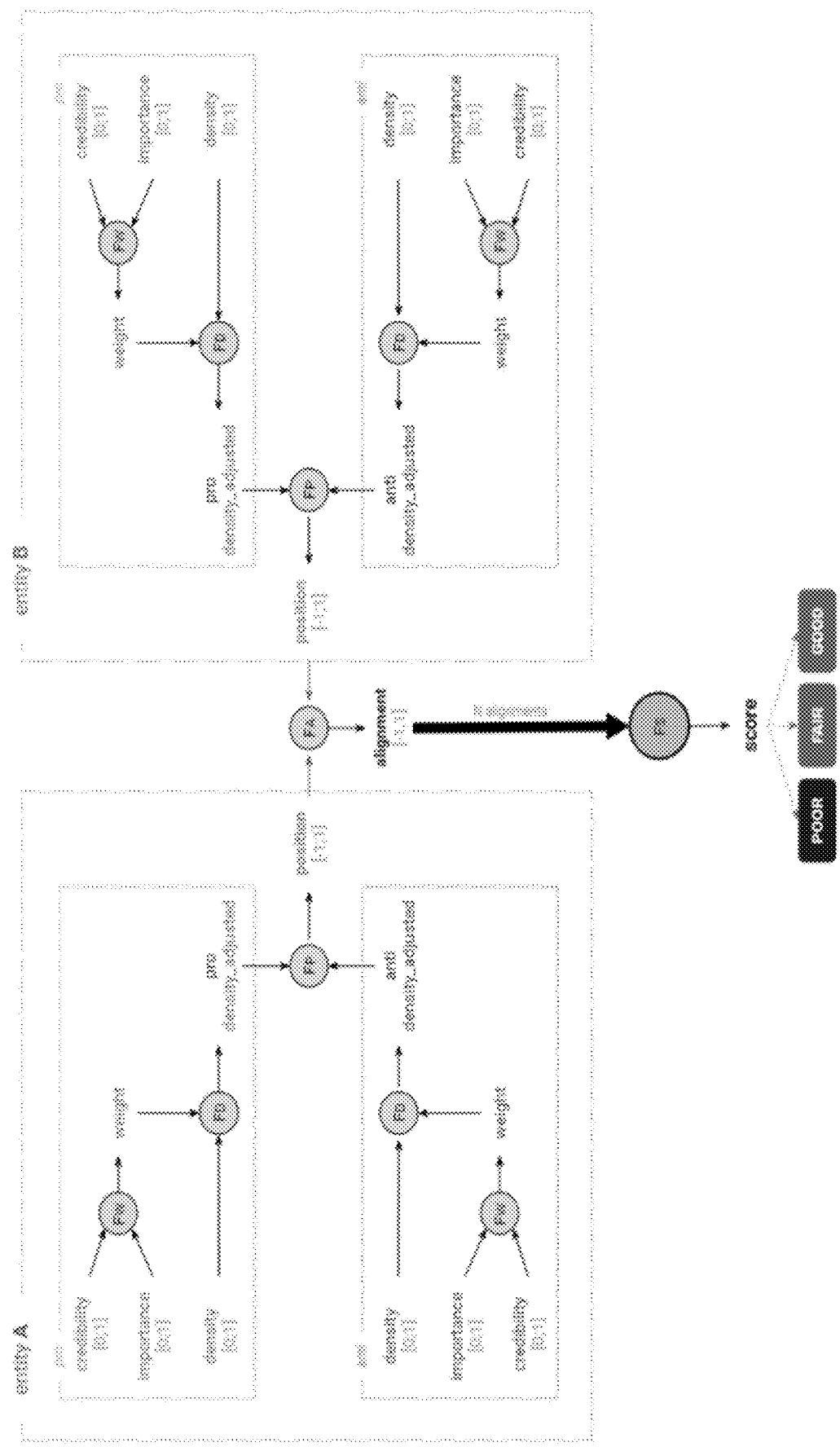

FIG. 8 illustrates the entire process in one embodiment, starting from the three inputs {credibility, importance, density} to the final score, using a variety of functions {FW, FD, FP, FA, FS}.

Figure 9:
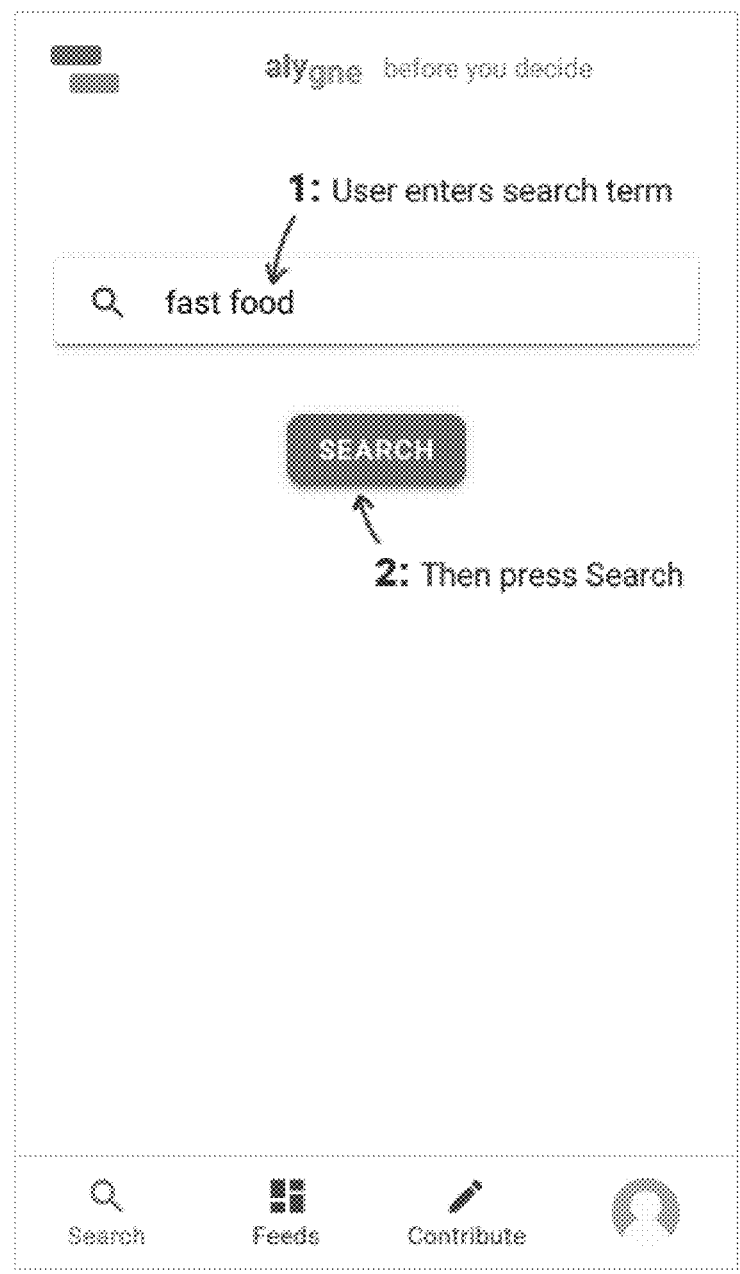
FIGS. 9-12 show exemplar user interface screenshots illustrating examples for the method of FIG. 2.
Figure 10:
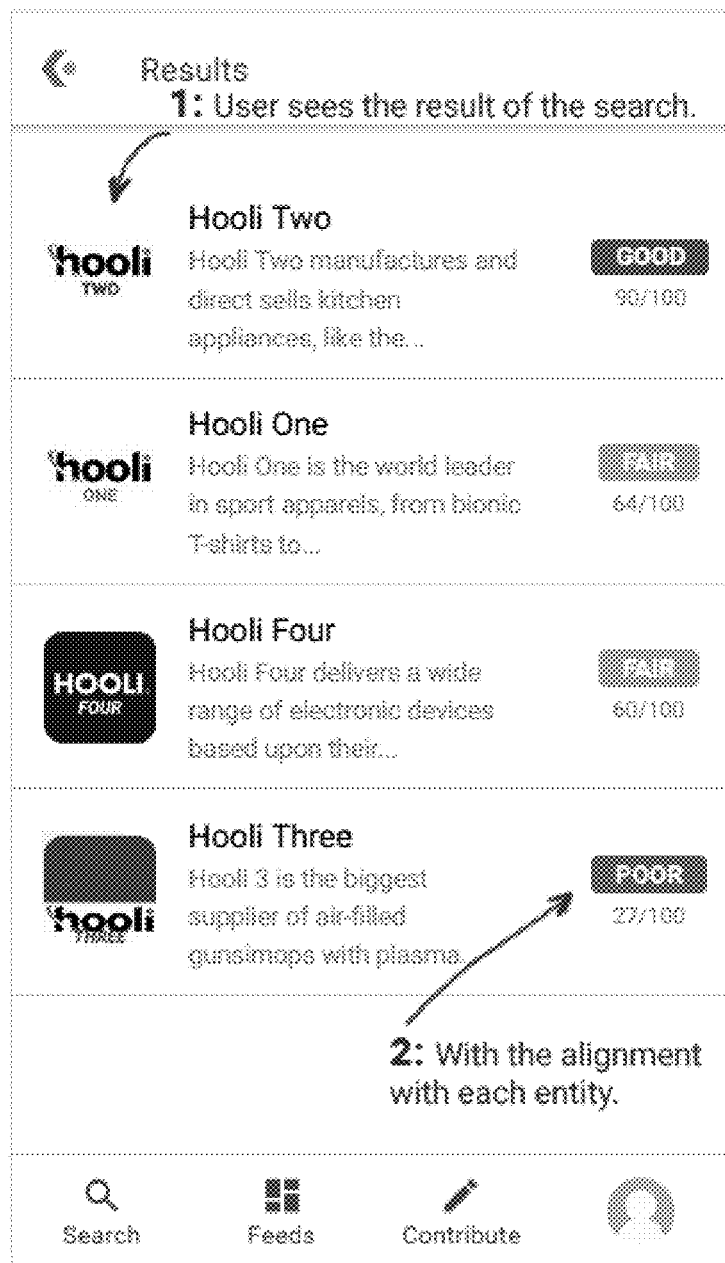
Figure 11:
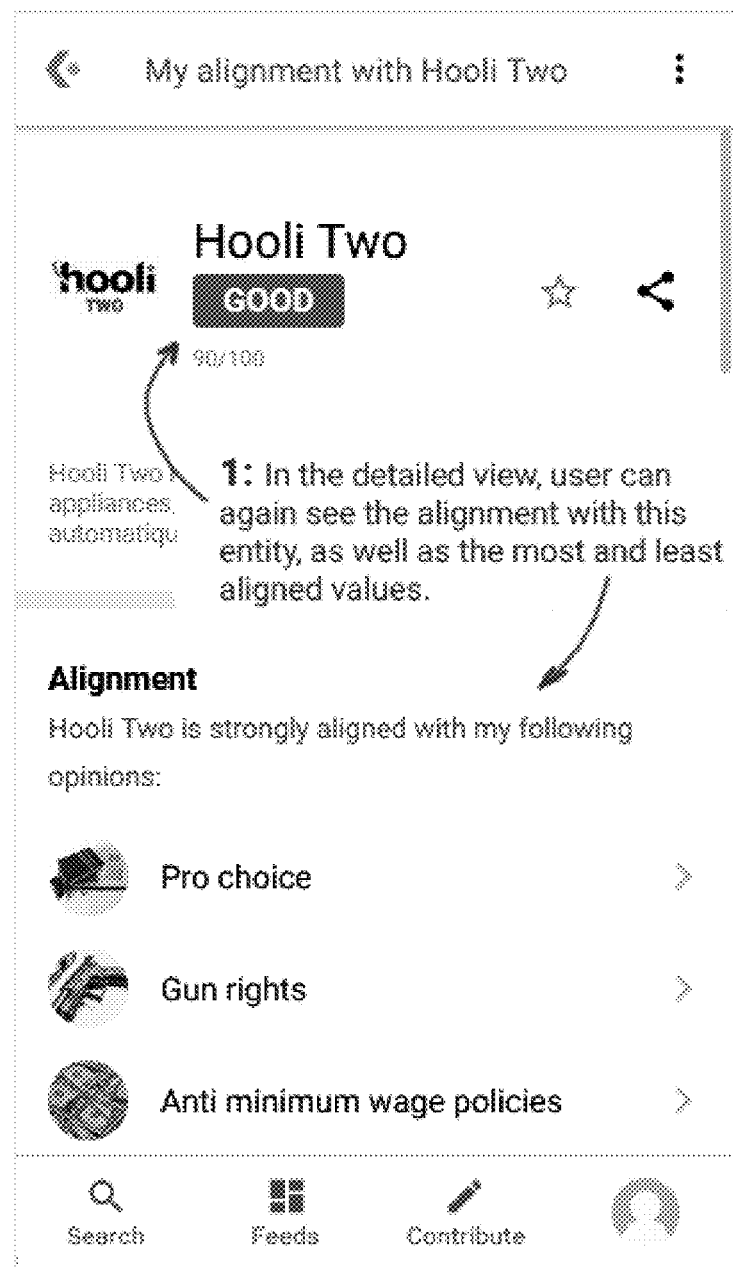
Figure 12:
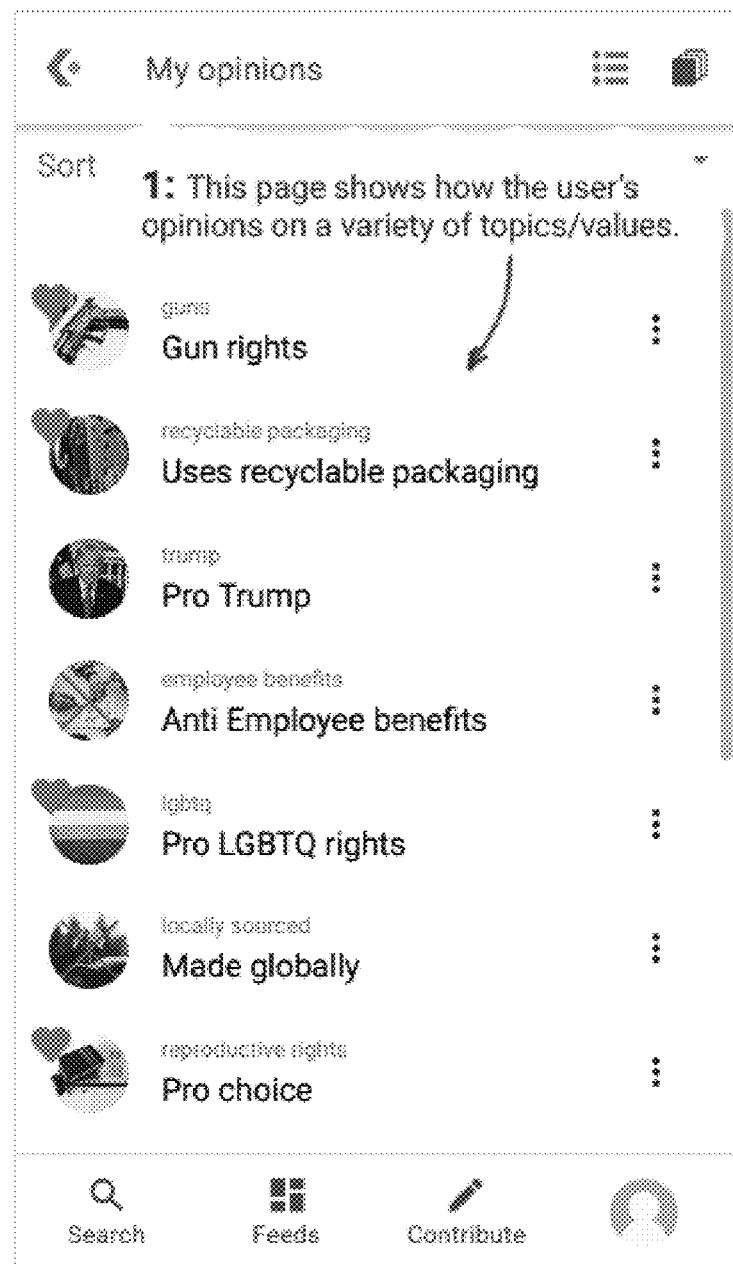

For example, FIG. 9 shows an exemplary UI for entering a search term such as "fast food" and receiving a user click on a search button. In this example, the search results show various restaurants matching the search term in FIG. 10. In this example, the search engine provides ratings such as "Good", "Fair", and "Poor", among others. FIG. 11 shows an expanded view of how the rating is determined, for this case the user and the entity Hooli Two is strongly aligned on Pro-Choice, Gun Rights, and Minimum Wage Values. The user can also see how he/she stands on certain topics/values. As shown in FIG. 12, issues important to the user includes gun rights, recyclable packaging, pro-Trump, employee benefits, LGBTQ rights, global trade, and pro-choice, among others.

Figure 13:
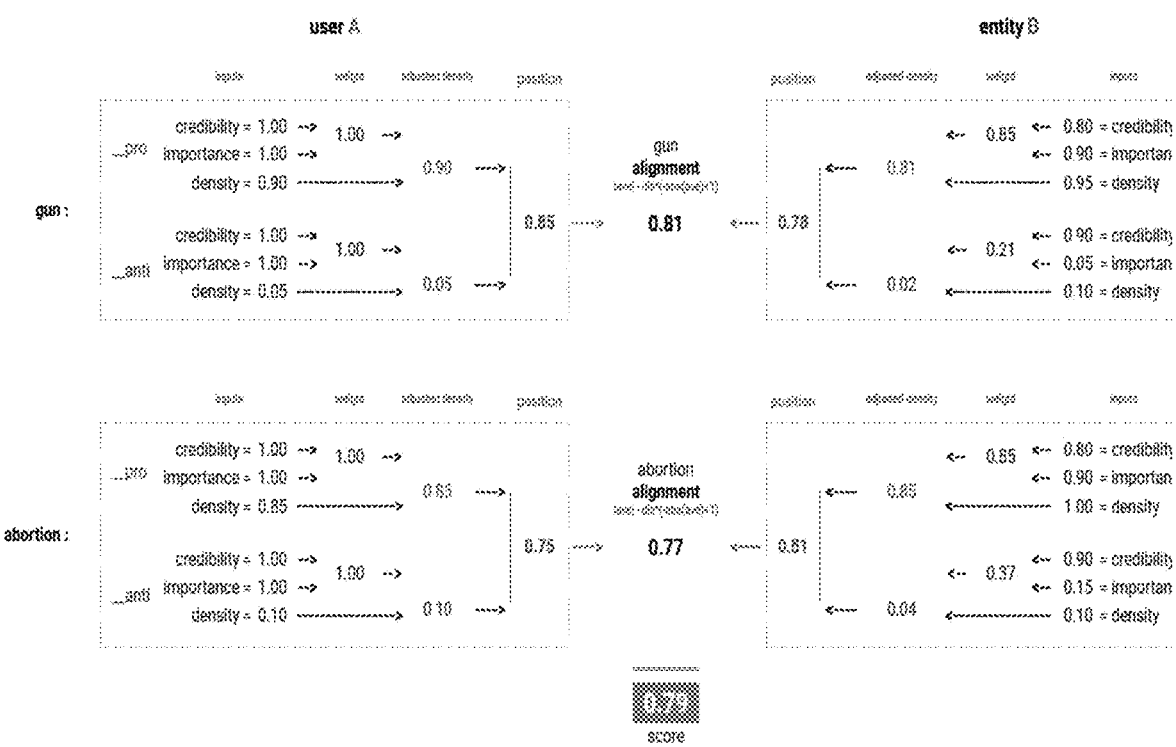
FIG. 13 shows an exemplary alignment determination.

FIG. 13 shows an alignment determination example illustrating the alignment of user A and entity B on two values: gun and abortion. The determination starts with the six inputs (credibility, importance, density, for both pro and anti) to calculate the positions. These are then used to calculate the alignments on the two values gun (0.81) and abortion (0.77). Finally, the alignment on each value is used to calculate the overall score between user A and entity B using the formulas discussed above.

Embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. Computer readable program instructions described herein can be stored in memory or downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Python has a large amount of libraries for implementing sentiment analysis or machine learning from scratch. NLTK, or the Natural Language Toolkit, is one of the leading libraries for building Natural Language Processing (NLP) models, thus making it a top solution for sentiment analysis. It provides useful tools and algorithms such as tokenizing, part-of-speech tagging, stemming, and named entity recognition. SpaCy is an industrial-strength NLP library in Python which can be used for building a model for sentiment analysis. It provides interesting functionalities such as named entity recognition, part-of-speech tagging, dependency parsing, and word vectors, along with key features such as deep learning integration and convolutional neural network models for several languages. Scikit-learn is a machine learning toolkit for Python that is excellent for data analysis. It features classification, regression, and clustering algorithms. TensorFlow is the dominant framework for machine learning in the industry. It has a comprehensive ecosystem of tools, libraries, and community resources that lets developers implement state-of-the-art machine learning models. PyTorch is another popular machine learning framework that is mostly used for computer vision and natural language processing applications. Developers love PyTorch because of its simplicity; it is very pythonic and integrates really easily with the rest of the Python ecosystem. PyTorch also offers a great API, which is easier to use and better designed than TensorFlow's API. Keras is a neural network library written in Python that is used to build and train deep learning models. It is used for prototyping, advanced research, and production. CoreNLP is Stanford's proprietary NLP toolkit written in Java with APIs for all major programming languages. It is powerful enough to extract the base of words, recognize parts of speech, normalize numeric quantities, mark up the structure of sentences, indicate noun phrases and sentiment, extract quotes, and much more. OpenNLP is an Apache toolkit designed to process natural language text with machine learning. It supports language detection, tokenization, sentence segmentation, part-of-speech tagging, named entity extraction, chunking, parsing, and conference resolution. Weka is a set of machine learning algorithms for data mining tasks. It includes tools for data preparation, classification, regression, clustering, association rules mining, and visualization. R is a programming language that is mainly used for statistical computing. Its most common users include statisticians and data miners looking to develop data analysis. Caret package includes a set of functions that streamline the process of creating predictive models. It contains tools for data splitting, pre-processing, feature selection, model tuning via resampling, and variable importance estimation. Mir is a framework that provides the infrastructure for methods such as classification, regression, and survival analysis, as well as unsupervised methods such as clustering.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments.

Additionally, it is understood in advance that the teachings recited herein are not limited to a particular computing environment. Rather, embodiments are capable of being implemented in conjunction with any type of computing environment now known or later developed. For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. The software/system may be offered based the following service models:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

A cloud computing environment is service oriented with a focus on statelessness, low coupling, modularity, and semantic interoperability. At the heart of cloud computing is an infrastructure comprising a network of interconnected nodes. Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT®.NET®, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims or requested exclusivity rather than by the foregoing description. All changes that come within the meaning and range of equivalency of the requested exclusivity are to be embraced within their scope.

What is claimed is:

1. A method to determine compatibility based on one or more social values, comprising:

collecting structured and unstructured text data on an entity and applying natural language processing to determine the entity value;

receiving a request for a value alignment between a user and the entity;

determining one or more user values associated with the entity;

determining one or more user values associated with the user by collecting structured and unstructured text data on the user and applying natural language processing thereto;

determining an alignment per value as a function of an average and a distance, weighted by a distance adjustment factor K and determining:

$$alignment = f(distance, average) = |average| - (distance/2)*K;$$

for each user value, determining a value alignment score between the one or more entity values and the one or more user values; and generating a composite compatibility rank between the user and the entity and providing a navigational aid that helps the user or the entity engage in a conversation focused on value and differentiation.

2. The method of claim 1, comprising determining a value position for the user and for the entity.

3. The method of claim 2, wherein the determining the value alignment score further comprises:

determining a pro-side metric for the entity;

determining a weight for the pro-side metric;

adjusting a pro-side density;

determining an anti-side metric for the entity;
determining a weight for the anti-side metric;
adjusting an anti-side density; and
determining a value position for the entity.

4. The method of claim 2, wherein the determining the alignment score further comprises:
determining a pro-side metric for the user;
determining a weight for the pro-side metric;
adjusting a pro-side density;
determining an anti-side metric for the user;
determining a weight for the anti-side metric;
adjusting an anti-side density; and
determining a value position for the user.

5. The method of claim 2, comprising determining an overall alignment score between the entity and the user based on all value alignment scores.

6. The method of claim 1, where in the social value comprises one of: opinion, cause, and practice.

7. The method of claim 1, where in the social value is determined based on region or location, comprising determining a relevance based on region or location.

8. The method of claim 1, comprising determining a density value reflecting a correlation between the entity or the user and a side of the value associated with the entity or the user.

9. The method of claim 1, comprising performing pre-processing by:
crawling content from the Internet for value content for users and entities;
processing the value content using natural language processing; and
determining pro-side and anti-side metrics for the entities or users.

10. The method of claim 9, comprising determining a credibility value reflecting an author ranking for each content.

11. The method of claim 1, comprising determining an importance value reflecting a correlation between the entity or the user and occurrences of the value.

12. The method of claim 1, comprising determining K as a linear distance adjustment, a log distance adjustment, or a log steep-end distance adjustment.

13. The method of claim 1, comprising determining three scoring zones: misaligned zone, poor alignment, and aligned zone.

14. The method of claim 1, comprising applying a learning machine to classify crawled text.

15. The method of claim 1, comprising receiving from a user computer a search for one or more entities, and for each matching entity, displaying the composite compatibility rank between the user and the matching entity.

16. A method to determine compatibility based on one or more social values, comprising:
collecting structured and unstructured text data on an entity and applying natural language processing to determine the entity value;
receiving a request for a value alignment between a user and the entity;
determining one or more user values associated with the entity;
determining one or more user values associated with the user by collecting structured and unstructured text data on the user and applying natural language processing thereto;
determining an alignment per value as a function of an average and a distance, weighted by a determining an adjusted density as:

$$\text{density\_adjusted} = \text{density} * FW$$

where $FW = \sqrt{\text{importance} * \text{credibility}}$, for each user value, determining a value alignment score between the one or more entity values and the one or more user values; and
generating a composite compatibility rank between the user and the entity and providing a navigational aid that helps the user or the entity engage in a conversation focused on value and differentiation.

17. The method of claim 16, comprising determining a position of the entity or the user as:

$$\text{position} = FP = \text{density\_adjusted\_pro} - \text{density\_adjusted\_anti}.$$

18. A method to determine compatibility based on one or more social values, comprising:
collecting structured and unstructured text data on an entity and applying natural language processing to determine the entity value;
receiving a request for a value alignment between a user and the entity;
determining one or more user values associated with the entity;
determining one or more user values associated with the user;
determining a score with M as an alignment score multiplier:

$$\text{score} = \sum_{v=1}^{v=n} Av * Mv \bigg/ \sum_{v=1}^{v=n} Mv$$

where
M=1.0 in zones "misalign" and "align";
m=|A| in zone "poor correlation"; and where $-1.0 \leq \text{score} \leq +1.0$;
for each user value, determining a value alignment score between the one or more entity values and the one or more user values; and
generating a composite compatibility rank between the user and the entity and providing a navigational aid that helps the user or the entity engage in a conversation focused on value and differentiation.

19. A system, comprising:
a data storage device;
a crawler adapted to traverse the Internet from the Internet for value content for users and entities to collect structured and unstructured text data on users and entities, and during a pre-processing mode, the crawler processing the value content using natural language processing; and
determining pro-side and anti-side metrics for the entities or users; and
a processor coupled to the data storage device, the processor executing computer readable instructions for:
receiving a request for a value alignment between a user and an entity;
determining one or more user values associated with the entity;
determining one or more user values associated with the user;
determining an alignment per value as a function of an average and a distance, weighted by a distance adjustment factor K, wherein alignment=|average|−(distance/2)*K;
for each user value, determining a value alignment score between the one or more entity values and the one or more user values; and
generating a composite compatibility rank between the user and the entity and providing a navigational aid that helps the user or the entity engage in a conversation focused on value and differentiation.

\* \* \* \* \*